Dec. 30, 1952     F. W. SAMPSON     2,623,405
STEERING WHEEL
Filed Nov. 1, 1950
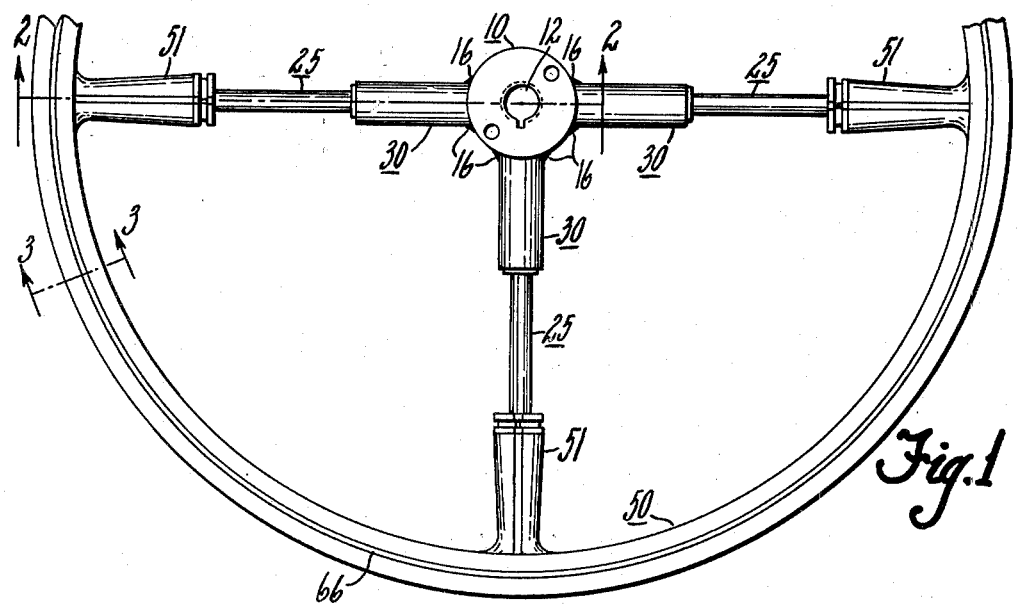
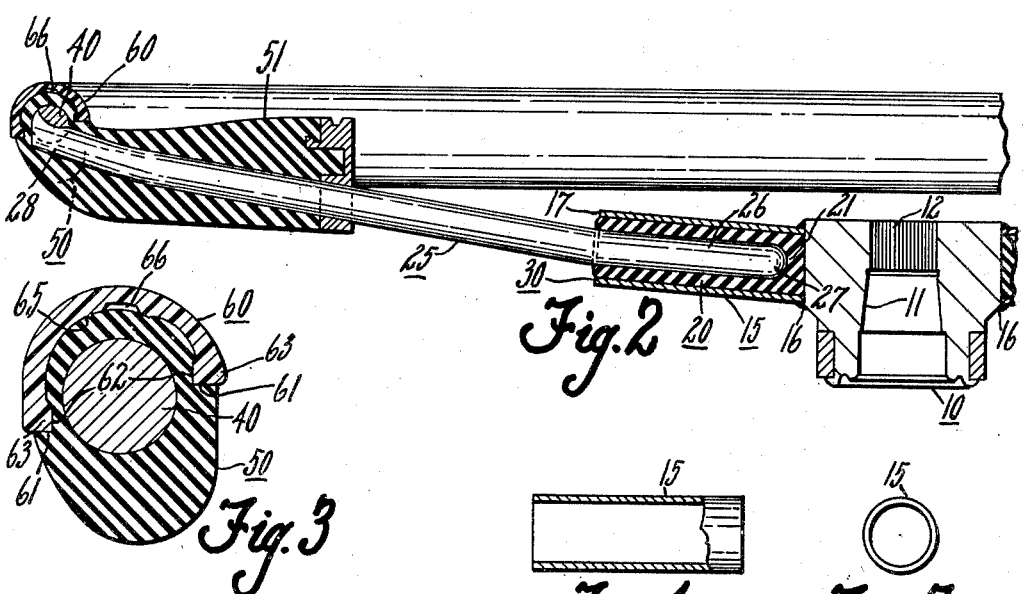
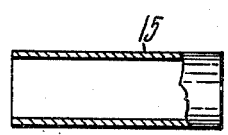
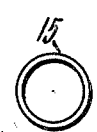
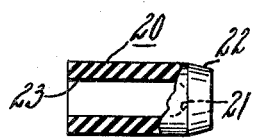
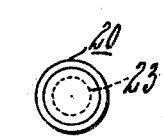
INVENTOR
FREDRICK W. SAMPSON
BY Willits Hardman & Jehn
HIS ATTORNEYS Patented Dec. 30, 1952

2,623,405

UNITED STATES PATENT OFFICE 2,623,405

STEERING WHEEL

Frederick W. Sampson, Dayton, Ohio, assignor to General Motors Corporation, Detroit, Mich., a corporation of Delaware Application November 1, 1950, Serial No. 193,336

4 Claims. (Cl. 74—552)

This invention relates to hand wheels, especially to such as are used as steering wheels on automotive vehicles.

Heretofore many different types of resilient steering wheels have been proposed having as their chief purpose to reduce vibrations normally transmitted from the steering shaft to the hands of the operator when the steering wheel rim is firmly grasped. For this purpose steering wheels having various somewhat complicated and relatively costly structures have been designed.

Now an object of this invention is to provide a simple and economically made vibration-dampening hub and spoke connection which can be readily incorporated with a steering wheel having any desired design of molded rim rigidly connected to the wheel spokes as in present day molded steering wheels. In such wheel the vibration-dampening connection at the inner ends of the spokes serves to dampen any tendency of the relatively rigid wheel rim and spokes to vibrate in any direction and especially to dampen rotary oscillations thereof.

Another object is to provide such a wheel hub and spoke connection wherein each spoke is individually isolated from and resiliently connected to the metal hub portion by an interposed vibration-dampening soft rubber bushing.

Another object is to provide a molded main rim body of resilient soft rubber or rubber-like material having a separately molded decorative cover encasing the more prominent surfaces of said soft rubber main rim body and held fixed thereupon by mutually interlocking portions on said main body and decorative cover.

Further objects and advantages of the present invention will be apparent from the following description, reference being had to the accompanying drawings wherein a preferred embodiment of the present invention is clearly shown.

In the drawings:

Fig. 1 is a partial plan view of an automotive steering wheel made according to this invention.

Fig. 2 is a sectional view taken on line 2—2 of Fig. 1.

Fig. 3 is a section thru the wheel rim taken on line 3—3 of Fig. 1.

Fig. 4 is a detail view, partially in vertical section, of the outer metal sleeve forming part of the resilient connection between the metal hub and one of the spokes.

Fig. 5 is an end view of Fig. 4.

Fig. 6 is a detail view, partly in vertical section, of the resilient rubber bushing forming part of a spoke and hub connection.

Fig. 7 is an end view of Fig. 6.

Similar reference characters refer to similar parts throughout the several views.

Numeral 10 designates the usual metal hub portion having a tapered bore 11 designed to fit down upon the tapered upper end of a steering shaft, and having a splined bore 12 designed to fit upon a correspondingly splined portion of the steering shaft for providing a positive driving engagement therebetween. For the 3-spoke wheel illustrated, three metal cylindrical outer sleeves 15 are each rigidly welded around its outer periphery to hub 10 as shown at 16. Each metal sleeve 15 has inserted therein and retains under the desired radial compression one of the resilient soft rubber bushings 20, which is shown in Figs. 6 and 7 in its normal unstressed size and shape and having an outer diameter greater than the bore of its metal sleeve 15. Each bushing 20 has a closed end 21 which is preferably slightly tapered at its outer diameter as shown at 22 in Fig. 6. The metal spokes 25 each have a round inner end portion 26 which fits snugly within the bore 23 of rubber bushing 20 when said bushing 20 is in unstressed form.

To assemble the spoke end 26 and bushing 20 within its outer sleeve 15 the soft rubber bushing 20 must be materially reduced in diameter from its unstressed form shown in Fig. 6 due to the smaller bore of sleeve 15. Such assembling may be done by first inserting the rounded spoke end 26 home within bore 23 of bushing 20 and then forcing the tapered end 22 of bushing 20 endwise into the smaller bore of sleeve 15. The rounded end surface 27 of spoke end 26 bears directly upon the closed end 21 of bushing 20, and thus stretches bushing 20 lengthwise and at the same time reduces its outer diameter sufficiently for it to be forced home endwise into the sleeve 15 to its final assembled position shown in section in Fig. 2. In order to facilitate such forcing of rubber bushing 20 into its sleeve 15, preferably a small metal funnel (not shown) is temporarily properly set upon and located in alignment with the outer end of sleeve 15 to more easily guide rubber bushing 20 into sleeve 15 and prevent it from being cut or otherwise marred by the outer end 17 of metal sleeve 15 as said rubber bushing 20 is forced into said metal sleeve 15. After the spoke end 26 and its rubber bushing 20 have been forced radially inwardly to their positions shown in Fig. 2 and the applied inward force on spoke 25 is released, the rubber bushing 20 will remain substantially in its distorted elongated position due to sleeve 15 preventing bushing 20 from again resuming its original larger diameter. Thus the rubber bushing 20 is retained permanently radially compressed between outer sleeve 15 and the inserted spoke end 26. The thus formed metal-isolating and vibration-dampening connection of each spoke 25 to the metal hub 10 is indicated by reference numeral 30.

After all the spokes 25 have been connected to hub 10 as above described, the reinforcing metal rim ring 40 is welded to the outer ends 28 of the radially projecting spokes 25 in any well-known manner, preferably by overlapping spoke ends 28 and rim ring 40 and electric welding these parts together under pressure to substantially integrate same and form strong welded joints. The wheel spider thus formed may be used as an insert in a suitable mold and have the main rim body 50 molded about rim ring 40 in a customary manner. Also the molded rim body 50 can readily be molded integral with the molded spoke portions 51, which may extend radially inward along metal spokes 25 as far as desired in any specific design.

According to this invention the molded main rim body 50 and molded spoke portions 51 are preferably made of relatively soft rubber which will provide an additional soft cushioning effect for shielding the hands of the operator from the vibrations of the steering wheel shaft. Since such a relatively soft rubber rim 50 does not have a well-appearing polished surface, such as is normally demanded in present day automotive steering wheels, the separately molded relatively hard decorative cover 60 of any suitable plastic material is provided for the more prominent and exposed surfaces of the wheel rim.

Now according to this invention the cross section of the soft rubber rim 50 is molded to the shape shown in Fig. 3, having shoulders 61 and small grooves 62 extending continuously around said rim 50. The separately molded decorative cover 60 is molded as a continuous one-piece ring to the cross section shown in Fig. 3, and is provided with interlocking edges 63 which fit snugly in place against shoulders 61 and in the small grooves 62 on the soft rubber body rim 50 when the separate cover 60 is finally pressed into place upon said soft rubber rim body 50, as illustrated in Fig. 3.

Preferably the decorative cover 60 is molded from a clear transparent plastic molding material, examples of which are Vinylite resin, polystyrene, cellulose acetate butyrate (tenite 2) and methyl methacrylate (Lucite). Such a transparent cover 60 after molding thereof and prior to assembling same on rim 50 preferably has its under surface 65 directly coated with any desired thin decorative coating applied by any well-known method, such as by spray coating a colored enamel coating thereon, or by depositing vaporized aluminum or other metal thereupon. Such a decorative coating will appear prominently visible thru the transparent plastic cover 60, yet since it lies on the underneath surface 65 thereof it will be fully protected against surface wear or other damage after cover 60 is assembled upon rim body 50 as shown in Fig. 3. Also any desired relief design in sprayed enamel colors or vaporized metal may be obtained in such decorative undercoating by molding the desired relief design in the under surface 65 at the time the separate cover 60 is molded. For example, the drawings show a relief groove 66 molded in the under surface 65 of cover 60. The surfaces of groove 66 may be coated with a vaporized metal or other coating while the remaining portions of the underneath surface 65 are spray coated with black enamel. In all cases the visible decorative coatings applied directly to the underneath surfaces of the transparent cover 60 are preferably later covered over by a suitable protective spray coat in order to prevent the first or visible coating from being scratched or otherwise marred prior to or while the cover 60 is being finally pressed into place on the relatively soft rubber rim 50.

As used herein, the term "rubber" includes any ordinary compounds of natural rubber and synthetic rubber-like materials.

While the embodiment of the present invention as herein disclosed, constitutes a preferred form, it is to be understood that other forms might be adopted.

What is claimed is as follows:

1. A steering wheel comprising a metal reinforcing rim ring, a molded rim body of a first molding material molded upon and embedding said rim ring, and a one-piece decorative cover ring molded from a second molding material fitting closely upon and encasing the upper surfaces of said rim body but extending only partially around the rim section, said decorative cover ring being separately molded as a unitary piece apart from said rim body and subsequently fixed in place upon said rim body by mutually interlocking portions on said cover ring and rim body.

2. A steering wheel having a metal rim ring and a main rim body of rubber-like material molded in situ upon and embedding said metal ring, a separately molded plastic decorative annular shell bodily pressed into place and overlying and encasing an outer prominent portion of the rim section, said annular shell having a generally half-circular cross section of such dimensions and resiliency that said decorative shell may have its cross sectional opening applied to and be forced to snap around a substantial portion of the cross section of said main rim body and be thereby strongly retained thereupon.

3. A steering wheel as claimed in claim 2 wherein said separately molded decorative shell is molded of a transparent plastic material and has a decorative coating applied to its underneath surface prior to assembling said shell upon said main rim body, whereby said decorative coating will appear prominently visible thru said transparent shell in the final wheel rim.

4. A steering wheel as claimed in claim 2 wherein said rim body is molded of relatively soft rubber-like material and said decorative shell is molded of relatively hard clear plastic material, said shell having a decorative thin coating of vaporized metal applied directly to its underneath surface prior to assembling said shell upon said main rim body, whereby said decorative coating will be prominently visible thru said clear plastic material in the final wheel rim.

FREDERICK W. SAMPSON.

REFERENCES CITED

The following references are of record in the file of this patent:

UNITED STATES PATENTS

| Number | Name | Date |
|---|---|---|
| 1,716,856 | Kidd | June 11, 1929 |
| 2,152,370 | Woollard | Mar. 28, 1939 |
| 2,155,488 | Hendrie | Apr. 25, 1939 |

FOREIGN PATENTS

| Number | Country | Date |
|---|---|---|
| 440,320 | Great Britain | Dec. 24, 1935 |
| 525,273 | Great Britain | Aug. 26, 1940 |